(12) United States Patent
Beauregard et al.

(10) Patent No.: US 8,062,446 B1
(45) Date of Patent: Nov. 22, 2011

(54) METHOD OF MAKING AN OUTER SHELL FOR HOCKEY OR LACROSSE PROTECTIVE PADS

(75) Inventors: Marco Beauregard, Morin Heights (CA); Marie-Claude Généreux, Ste-Thérèse (CA); Jean-François Laperrière, Prévost (CA); Philippe Jean, Terrebonne (CA); Mathieu Contant, Verdun (CA)

(73) Assignee: Bauer Hockey, Inc., Greenland, NH (US)

( * ) Notice: Subject to any disclaimer, the term of this patent is extended or adjusted under 35 U.S.C. 154(b) by 11 days.

(21) Appl. No.: 12/847,305

(22) Filed: Jul. 30, 2010

(51) Int. Cl.
| | |
|---|---|
| *B32B 7/08* | (2006.01) |
| *B32B 37/00* | (2006.01) |
| *B29C 51/14* | (2006.01) |
| *B29C 65/00* | (2006.01) |
| *B29C 45/14* | (2006.01) |
| *B29C 67/20* | (2006.01) |
| *B27N 3/10* | (2006.01) |

(52) U.S. Cl. ......... 156/93; 156/224; 264/257; 264/321

(58) Field of Classification Search .............. 156/60, 156/66, 77, 78, 91, 92, 93, 166, 167, 176, 156/178, 179, 180, 181, 182, 196, 212, 213, 156/214, 221, 222, 224, 228, 242, 243, 244.11, 156/244.18, 244.19, 244.23, 244.24, 244.27, 156/246, 250, 256, 264, 269, 270, 276, 292, 156/296, 308.2, 309.6, 311, 324.4, 325, 326, 156/327, 330.9, 331.7, 334; 264/239, 241, 264/257, 291, 292, 299, 319, 320, 321, 325, 264/330, 331.11, 331.16; 2/455, 459, 461, 2/462, 463, 464, 465, 12, 22, 24
See application file for complete search history.

(56) References Cited

U.S. PATENT DOCUMENTS

| 6,070,273 A * | 6/2000 | Sgro ............................ 2/455 |
| 2006/0080762 A1 * | 4/2006 | Kobren et al. .................. 2/463 |

* cited by examiner

*Primary Examiner* — Philip Tucker
*Assistant Examiner* — Brian R Slawski (57) ABSTRACT

A method of making an outer shell, the method comprising: (a) providing first and second sheets, each of the first and second sheets being made of a layer of high-density polyethylene, polypropylene, polyurethane or polycarbonate extruded with a layer of non-woven fabric; (b) providing a third sheet made of high-density polyethylene foam, polypropylene foam, polyurethane foam or polystyrene foam, the third sheet having top and bottom sides; (c) affixing a first layer of adhesive film on the top side of the third sheet; (d) affixing a second layer of adhesive film on the bottom side of the third sheet; (e) placing the third sheet between the first and second sheets such that the first layer of adhesive film of the third sheet contacts the layer of non-woven fabric of the first sheet and the second layer of adhesive film of the third sheet contacts the layer of non-woven fabric of the second sheet; (f) stitching together the first, second and third sheets in order to form a composite sheet; and (g) thermoforming the composite sheet for forming the outer shell wherein the outer shell has a shape suitable for a hockey or lacrosse leg pad, shoulder pads or elbow pad.

17 Claims, 5 Drawing Sheets

FIG. 6

METHOD OF MAKING AN OUTER SHELL FOR HOCKEY OR LACROSSE PROTECTIVE PADS

FIELD OF THE INVENTION

The present invention relates to a method of making an outer shell for protective pads, such as elbow pads, leg pads and shoulder pads that are used in hockey or lacrosse.

BACKGROUND OF THE INVENTION

Protective pads are useful for protecting a portion of a wearer's body from injury, such as from collisions with an object or contact with another person. Typically, such pads are formed from an outer shell that is formed from a harder material, and an inner shell, which is formed from a softer material. These materials are generally formed and shaped to correspond to that of a particular portion of the body such that their application may provide the desired protection for the body part or portion. For example, a hockey or lacrosse elbow pad would be formed to correspond to the general shape of the human elbow.

However, the weight of the protective pad, and in particular, the weight of the hard outer shell, may fatigue the player unduly.

Consequently, there is a need in the industry for an improved method of manufacturing an outer shell possessing shock-absorbing qualities while also providing weight savings.

SUMMARY OF THE INVENTION

According to a broad aspect, the present invention provides a method of making an outer shell, the method comprising: (a) providing first and second sheets, each of the first and second sheets being made of a layer of high-density polyethylene, polypropylene, polyurethane or polycarbonate extruded with a layer of non-woven fabric; (b) providing a third sheet made of high-density polyethylene foam, polypropylene foam, polyurethane foam or polystyrene foam, the third sheet having top and bottom sides; (c) affixing a first layer of adhesive film on the top side of the third sheet; (d) affixing a second layer of adhesive film on the bottom side of the third sheet; (e) placing the third sheet between the first and second sheets such that the first layer of adhesive film of the third sheet contacts the layer of non-woven fabric of the first sheet and the second layer of adhesive film of the third sheet contacts the layer of non-woven fabric of the second sheet; (f) stitching together the first, second and third sheets in order to form a composite sheet; and (g) thermoforming the composite sheet for forming the outer shell wherein the outer shell has a shape suitable for a hockey or lacrosse leg pad, shoulder pads or elbow pad.

The method may further comprise the steps of placing the composite sheet in an oven at a temperature between 125° C. and 175° C. during 10 to 20 minutes and of removing the composite sheet from the oven before the thermoforming step.

The thermoforming step can be made at a pressure between 25 PSI to 50 PSI during 60 to 80 seconds.

This and other aspects and features of the present invention will now become apparent to those of ordinary skill in the art upon review of the following description of specific embodiments of the invention and the accompanying drawings.

BRIEF DESCRIPTION OF THE DRAWINGS

A detailed description of embodiments of the present invention is provided hereinbelow with reference to the following drawings, in which.

In the drawings, embodiments of the invention are illustrated by way of example. It is to be expressly understood that the description and drawings are only for purposes of illustration and as an aid to understanding, and are not intended to be a definition of the limits of the invention.

DETAILED DESCRIPTION OF THE EMBODIMENTS OF THE INVENTION

To facilitate the description, any reference numeral designating an element in one figure will designate the same element if used in any other figures. In describing the embodiments, specific terminology is resorted to for the sake of clarity but the invention is not intended to be limited to the specific terms so selected, and it is understood that each specific term comprises all equivalents.

Unless otherwise indicated, the drawings are intended to be read together with the specification, and are to be considered a portion of the entire written description of this invention. As used in the following description, the terms "horizontal", "vertical", "left", "right", "up", "down" and the like, as well as adjectival and adverbial derivatives thereof (e.g., "horizontally", "rightwardly", "upwardly", "radially", etc.), simply refer to the orientation of the illustrated structure. Similarly, the terms "inwardly," "outwardly" and "radially" generally refer to the orientation of a surface relative to its axis of elongation, or axis of rotation, as appropriate.

Figure 1:
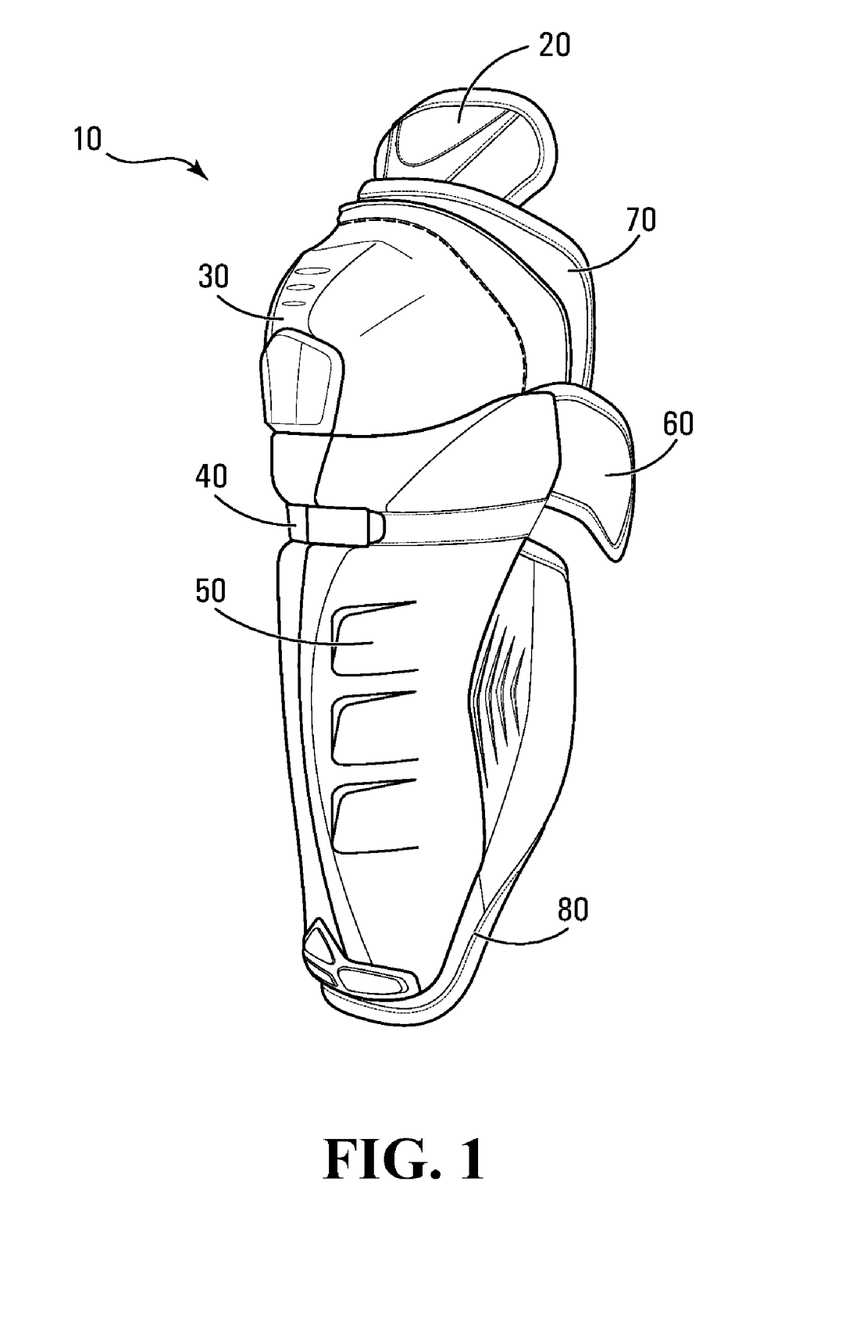
FIG. 1 is a perspective elevational view of a hockey or lacrosse leg pad including an outer shell made in accordance with the method of the present invention.

FIG. 1 shows a leg pad 10 for a hockey or lacrosse player comprising a lower quadriceps protector 20, a knee guard 30, an adjustment strap 40, a shin guard 50, a side protector 60, an upper padding liner 70 and a lower padding liner 80. It should be understood that the components of the leg pad 10 listed above are shown for purposes of example only and that not all of the illustrated components are necessary features of a leg pad comprising an outer shell manufactured in accordance with an embodiment of the present invention.

The knee guard 30 and the shin guard 50 are typically comprised of an outer shell that is mounted on or otherwise attached (e.g., via adhesives, stitching or other fasteners known in the art) to the upper padding liner portion 70 and lower padding liner portion 80 respectively. The outer shell of the guards 30 and 50 are typically formed to conform to the general shape of the body part received by the guard, namely the kneecap and the shin, which typically refers to the portion of the leg which generally lies below the knee and above the ankle. As a result, the guards 30 and 50 can provide protection without negatively affecting the mobility of the wearer.

Figure 2A:
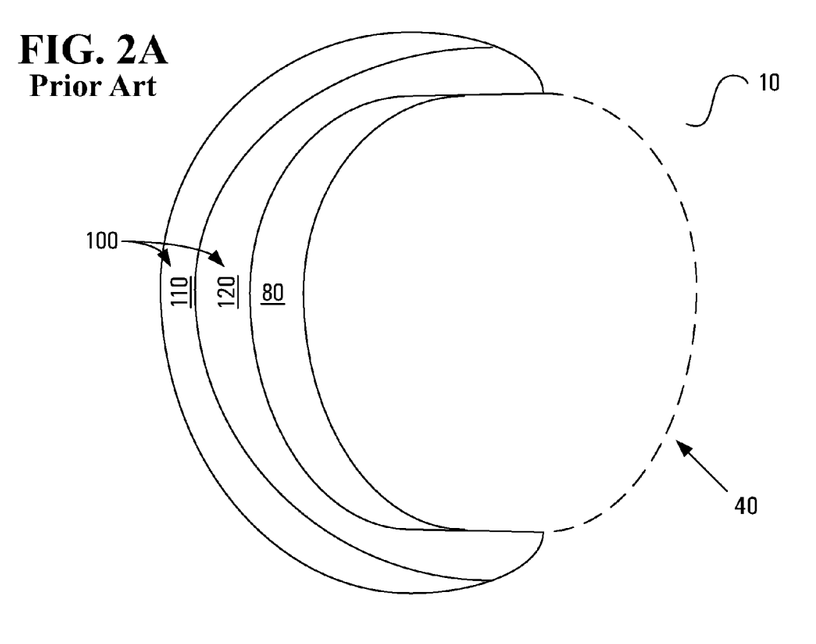
FIG. 2A is a schematic cross-sectional view of the components of a typical hockey or lacrosse leg pad that is known in the art.
Figure 2B:
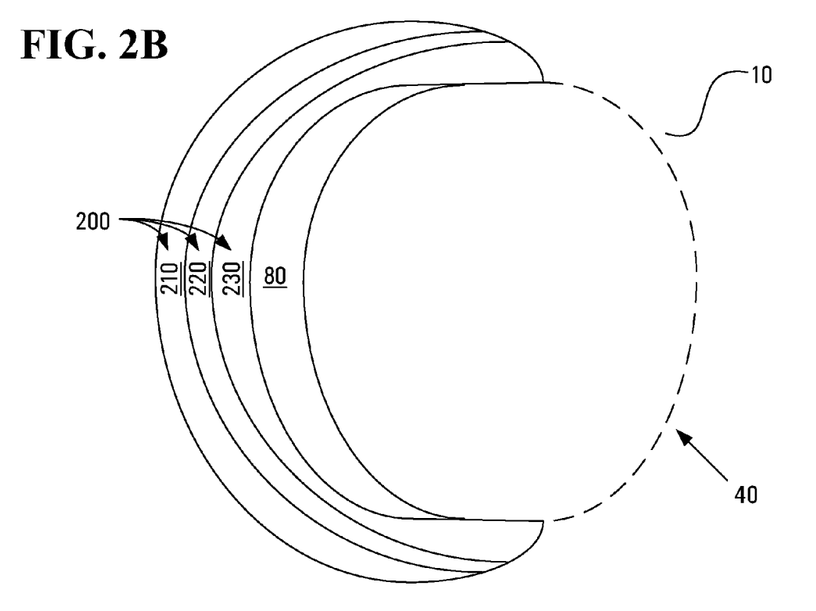
FIG. 2B is a schematic cross-sectional view of the components of a hockey or lacrosse leg pad including an outer shell made in accordance with the method of the present invention.

FIGS. 2A and 2B show schematic cross-sectional views of certain components of the lower portion of the leg pad 10, namely, the shin guard, the adjustment strap 40 and the lower padding liner 80.

FIG. 2A shows the construction of an outer shell 100 that is typically comprised of two (2) portions, namely an outer layer 110 and an inner layer 120.

The outer layer 110 is intended to provide the primary source of protection against collisions with extraneous objects and/or contact with other people. As a result, this portion is typically formed from a material chosen primarily for its strength and resistance to impact, such as from plastic or a similar material. The inner layer 120 is typically formed from a material (such as polystyrene or Styrofoam) that while still quite impact-resistant, is also somewhat softer than the material selected for the outer layer 110 in order to provide some cushioning to the wearer against collisions. The outer and inner layers 110 and 120 of the shin guard 100 can be stitched together.

Those skilled in the art will appreciate that the construction of the outer shell 100 requires that the outer layer 110 and the inner layer 120 must be of a certain minimum thickness in order to provide sufficient protection for the wearer's shin against collisions from extraneous objects and/or contact from other people. Although the thickness of the layers 110 and 120 can be varied to a certain extent (e.g., by adjusting the thickness at the center of the shell versus at its edges), it is quite probable that the thickness of each layer likely contributes significantly to the overall weight of the outer shell 100.

FIG. 2B shows the construction of an outer shell 200 is made in accordance with a non-limiting embodiment of the present invention. In this embodiment, the shell 200 has three (3) layers, namely an outer layer 210, an intermediate layer 220 and an inner layer 230. The outer layer 210 is intended to provide the primary protection from collisions with extraneous objects. As a result, the outer layer 210 is formed from a material selected primarily for its strength and resistance to impact.

In contrast, the intermediate layer 220 is intended to act as a shock absorber between the outer layer 210 and the inner layer 230. To facilitate this, this portion is typically comprised from a foam- or mousse-like material that provides a certain degree of compression and can deform under pressure. The use of such a compressible material for the intermediate layer 220 may allow this portion of the shell 200 to provide a certain degree of cushioning against extraneous shocks delivered against the outer layer 210.

In addition, the use of such a compressible material also allows the intermediate layer 220 to deform under pressure and then return to its original shape and/or form after such pressure is removed. As a result, the intermediate layer 220 provides the shell 200 with a certain amount of so-called "give" when pressure is applied to it, such as from the force of an impact with an extraneous object or other player. In particular, the force from such an impact may cause the outer layer 210 to move towards the wearer's leg, and in particular towards the intermediate layer 220 and the inner layer 230.

Since the intermediate layer 220 is comprised of compressible material, the material in this portion deforms under pressure, thus absorbing some of the force generated by the impact. This means that the resulting force of the impact on the player is lessened because the deformation of the compressible material typically absorbs some of the overall shock of the impact.

Furthermore, once the pressure from the impact has been absorbed and/or is dissipated by the deformation of the compressible material in the intermediate layer 220, the material in this portion returns to its previous form.

The inner layer 230 may be comprised of a similar material as used for the outer layer 210. By using similar material(s) for the outer and inner layers 210, 230 such that these layers sandwich the intermediate layer 220, and by using compressible material for this intermediate layer, that construction creates an outer shell that is better able to return to its original form after an impact.

For example, impacts delivered to the outer layer 210 that apply pressure to, and cause the deformation of, the compressible material in the intermediate layer 220 may be resisted by the relatively harder material of the inner layer 230 of the shell 200. When such pressure is removed, the resistance of the inner layer 230 against the intermediate layer 220 may allow the deformed material in this portion to 'spring back' more quickly, thus reducing the time required for the compressible material to return to its original form.

Figure 3:
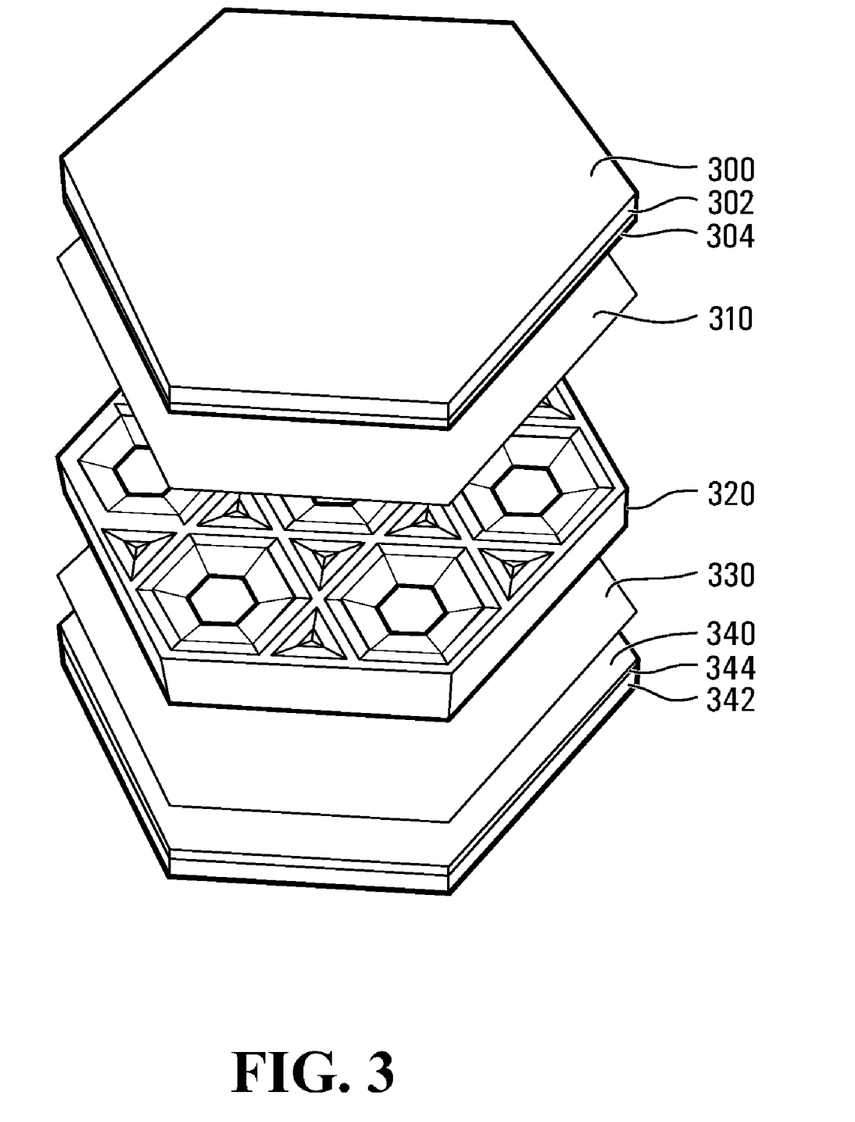
FIG. 3 is a schematic exploded perspective view of the components of the outer shell made in accordance with the method of the present invention.

FIG. 3 is a schematic view of the components of the outer shell 200 and which can be produced using a method that will be described below. This material is comprised of a first (top) sheet 300, a second (bottom) sheet 340 and a third (intermediate) sheet 320 that are brought into substantial contact via a first adhesive film layer 310 and a second adhesive film layer 330.

The top sheet 300 is typically comprised of a combination of two (2) different materials, namely a first sub-material layer 302 and a second sub-material layer 304. In a non-limiting embodiment, the first sub-material layer 302 is made of a layer of high-density polyethylene, polypropylene, polyurethane or polycarbonate and the second sub-material layer 304 is made of now-woven fabric. The first and second sub-material layers 302 and 304 are arranged such that one of their lateral surfaces is in substantial contact with each other. In the non-limiting embodiment shown in FIG. 3, the first sub-material layer 302 has been extruded or laminated with the second sub-material layer 304.

In a similar manner, the bottom sheet 340 is also typically comprised of two (2) different sub-material layers, namely a first sub-material layer 342 and a second sub-material layer 344. In a non-limiting embodiment, a non-woven fabric is generally used for the second sub-material layer 344, while the first sub-material layer 342 is made of a layer of high-density polyethylene, polypropylene, polyurethane or polycarbonate. As before, the first and second sub-material layers 342, 344 have been extruded or laminated together.

Those skilled in the art will appreciate that the first and second sub-material layer combinations 302/304 and 342/344 are identical for both the top layer 300 and the bottom layer 340 (i.e. a layer of high-density polyethylene, polypropylene, polyurethane or polycarbonate extruded with a layer of non-woven fabric). This may allow the first and second sheets 300 and 340 to be made from a single source material, the use of which may also allow the realization of certain cost-savings during production of the outer shell 200.

The third intermediate sheet 320 corresponds to the intermediate layer 220 described above. Unlike the sheets 300 and 340 that are made from sub-materials, the intermediate sheet 320 is typically comprised of a single, homogeneous material. As previously described with regards to the intermediate layer 220, a compressible mousse- or foam-like material that can temporarily deform under pressure to absorb shocks and/ or dissipate pressure is typically selected for the intermediate sheet 320 to provide shock-absorption, as well as allow for a reduction in the weight of the shell 200. For example, the intermediate sheet 320 can be made of high-density polyethylene foam, polypropylene foam, polyurethane foam or polystyrene foam.

As shown in FIG. 3, the intermediate sheet 320 is made of high-density polyethylene foam, polypropylene foam, polyurethane foam or polystyrene foam that has a three-dimensional shape (honeycomb shape) that forms a structure (structural foam) for providing more impact resistance while being lighter than a corresponding sheet made of such foams.

The intermediate sheet can also be made of high-density polyethylene foam, polypropylene foam, polyurethane foam or polystyrene foam that is comprised of voids (e.g., bubbles or pockets) or channels in which air or another inert gas (such as nitrogen) has been captured during manufacture.

The high-density polyethylene foam, polypropylene foam, polyurethane foam or polystyrene foam can be made from gas assist molding techniques. As known in the art, gas assist molding or gas injection molding is used to create parts with hollow interiors. Partial shot of foams is then followed by high-pressure gas to fill the mold cavity.

The high-density polyethylene foam, polypropylene foam, polyurethane foam or polystyrene foam can also be made from structural foam molding techniques. As know in the art, structural foam molding is a process of plastic molding usually used for parts that require thicker walls than standard injection molding. Inserting a small amount of nitrogen or chemical blow agent into the foam material makes the walls thicker. Foaming happens as the melted foam material enters the mold cavity. A thin plastic skin forms and solidifies in the mold wall.

The density of the high-density polyethylene foam could be between 0.09 to 0.15 $gr/cm^3$ while the density of the polystyrene foam could be between 0.05 to 0.15 $gr/cm^3$.

The two (2) film layers 310 and 330 are typically used to attach and secure the intermediate sheet 320 to the facing surfaces of the top and bottom sheets 300 and 340, namely the sub-material layers 304 and 344 made of non-woven fabric. In a non-limiting embodiment, the film layers 310 and 330 can be formed from ethylene vinyl acetate thermoplastic or polyurethane film, whose surfaces have had an adhesive material (such as a glue or epoxy) applied to them.

Bringing the surfaces of the film layer 310 into substantial contact with the upper surface of the intermediate sheet 320 and the sub-material layer 304 allows the sheets 300 and 320 to become attached. Similarly, bringing the surfaces of the film layer 330 into substantial contact with the bottom surface of the intermediate sheet 320 and the sub-material layer 344 allows the sheets 320 and 340 to become attached.

Figure 4:
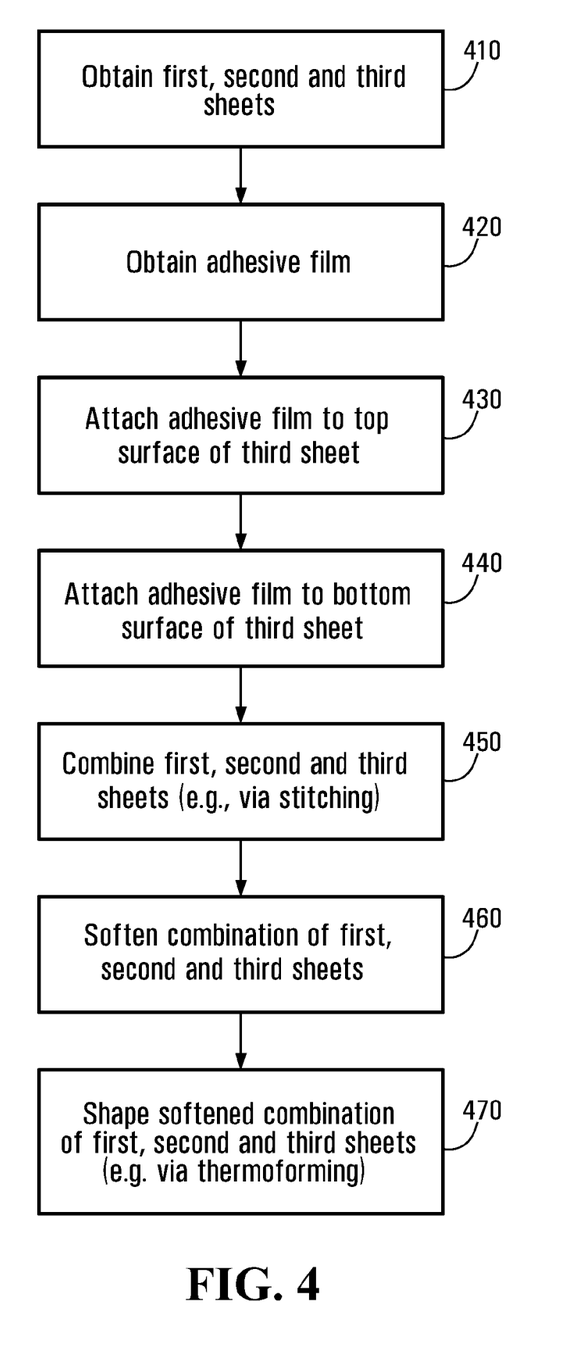
FIG. 4 is a block flow chart showing the steps involved in the method of the present invention.

FIG. 4 provides a block diagram explaining the method by which the components described with respect to FIG. 3 may be combined to form the outer shell 200. At step 410, sheets of the first, second and third materials are obtained. For the sake of simplicity, the first sheet corresponds to the sheet 300 and the second sheet corresponds to the bottom sheet 340. The third sheet corresponds to the intermediate sheet 320 that lies between the sheets 300 and 340.

Obtaining the first, second and third sheets in this step may involve the performance of certain operations that are known in the art but have been omitted here for the sake of brevity. For example, the first (top) sheet 300 and/or third (bottom) sheet 340 are obtained from extrusion of a sheet (layer) made of high-density polyethylene, polypropylene, polyurethane or polystyrene with a sheet (layer) made of non-woven fabric.

If the top and bottom sheets 300 and 340 come from a single source material comprised of identical sub-materials, such as a sheet made of layers of high-density polyethylene, polypropylene, polyurethane or polystyrene laminated or extruded with a layer made of non-woven fabric, then this material may be otherwise adjusted or cut to form the first and second sheets during this step. In addition, the second (intermediate) sheet 320 made of high-density polyethylene foam, polypropylene foam, polyurethane foam or polystyrene foam may need to be cut during this step such that its dimensions and shape match those for the first and third sheets 300, 340. Since it is believed that these operations are known in the art, further details regarding them need not be provided here.

At step 420, layers of adhesive film are obtained. This step comprises obtaining the ethylene vinyl acetate thermoplastic or polyurethane adhesive film layers 310 and 330 previously described with respect to FIG. 3. Since the extrusion of such film, as well as the application of adhesive(s) to their surfaces, is believed to be well-known in the art, further details regarding this step need not be provided here.

At step 430, a first layer of adhesive film is attached to the top surface of the second sheet. With respect to FIG. 3, this step corresponds to placing one of the surfaces of the adhesive film layer 310 in substantial contact with the top surface of the intermediate sheet 320.

Although a single sheet of adhesive film is typically applied to the top surface of the second sheet during this step, it may be necessary under certain circumstances to add a further layer of adhesive film to ensure that the bond created between the sheets 300, 320 remains strong. As a result, it may be necessary to apply further layers of adhesive made of ethylene vinyl acetate thermoplastic or polyurethane film on top of the adhesive film layer 310 under such circumstances.

Step 430 may also involve certain operations that need to be performed in order to ensure that substantial contact is made between one of the surfaces of the first layer of adhesive film and the top surface of the second sheet, such as maintaining the respective facing surfaces of the film layer 310 and the intermediate sheet 320 against each other for 1 to 5 seconds at a temperature between 75° C. and 100° C.

At step 440, a second layer of adhesive film is attached to the bottom surface of the second sheet. With continued reference to FIG. 3, this step corresponds to placing a surface of the film layer 330 in substantial contact with the bottom surface of the intermediate sheet 320. As in the previous step, ensuring substantial contact between the respective facing surfaces of the adhesive film layer 330 and the intermediate sheet 320 may involve maintaining the surfaces together for 1 to 5 seconds at a temperature between 75° C. and 100° C.

It will be appreciated that at the completion of step 440, both surfaces of the intermediate sheet 320 are attached to one of the two surfaces of the respective film layers 310 and 330.

At step 450, the first, second and third sheets are combined to form a single composite sheet. The means by which the composite sheet may be formed may vary depending on the particular materials in the top, intermediate and bottom sheets 300, 320 and 340, as well as on the particular film used for the film layers 310 and 330.

For example, in a non-limiting embodiment, the film layers 310 and 330 are adhesive film layers formed from ethylene vinyl acetate thermoplastic or polyurethane, where adhesive has been applied to both surfaces. In such a case, performing step 450 may involve bringing the adhesive film layers 310, 330 into substantial contact with the corresponding sub-material surfaces 304, 344 made of non-woven fabric and stitching the three sheets together.

The result of step 450 is the creation of a composite sheet that is comprised of the first, second and third sheets. Although such a sheet may be pre-formed to a certain extent for the production of a final product (e.g., the outer shell 200), it is often necessary to shape this sheet further.

At step 470, the softened composite sheet is formed and shaped to its final form, such as that of the outer shell 200. In a non-limiting embodiment, the composite sheet is thermoformed at a particular pressure for a pre-determined duration to shape it to its final form. For example, the softened composite sheet is thermoformed at a pressure between 25 and 50 PSI for a period of 60 to 80 seconds to produce the shape and dimensions suitable for the outer shell 200. The thermoforming step can be performed at a temperature between 125° C. and 175° C.

The method may include a further step where the composite sheet is softened before being thermoformed to the shape of the final outer shell 200. To do this, at step 460, the composite sheet is placed in an oven that is heated to a temperature between 125° C. and 175° C. for a period of 10 to 20 minutes in order to soften it. The composite sheet is afterwards removed from the oven before being thermoformed.

The outer shell made in accordance with the above described method has a density between 0.2 g/cm3 and 0.7 g/cm3. Moreover, and outer shell made in accordance with the above described method and having a thickness of 5 mm has a rigidity of between 20 Newton and 40 Newton.

Those skilled in the art will understand that other pressure range and time combinations, as well as other means of forming and shaping the composite sheet other than thermoforming, would also fall within the scope of the present invention.

It will be further appreciated that the method described above and illustrated by the flow chart in FIG. 4 could be used to form outer shells (or components thereof) other than the outer shell 200 of the leg pad 10. To illustrate this, FIGS. 5 and 6 show alternative protective pads that could have the same configuration illustrated in FIG. 3 and could be manufactured using the same process described with respect to FIG. 4.

Figure 5:
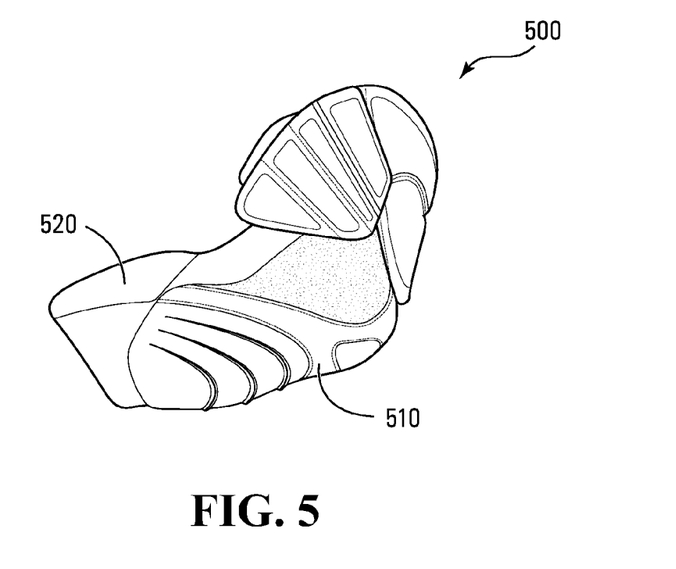
FIG. 5 is a perspective view of hockey or lacrosse elbow pad including a second outer shell made in accordance with the method of the present invention.
Figure 6:
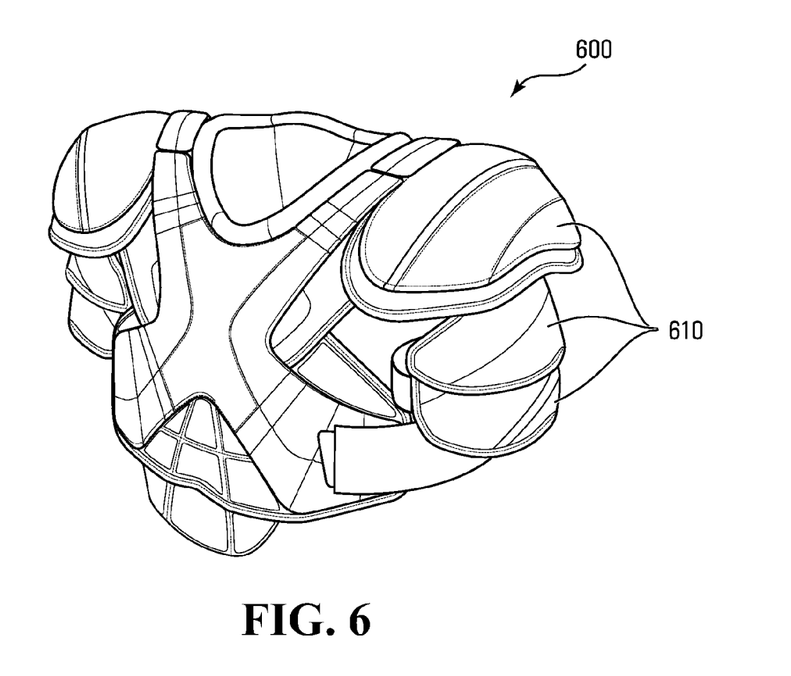
FIG. 6 is a perspective view of hockey or lacrosse shoulder pads including different outer shells made in accordance with the method of the present invention.

For example, FIG. 5 shows an elbow pad 500 for a hockey or lacrosse player. The hockey or lacrosse elbow pad 500 has an outer shell 510 and a padding liner 520. Although the hockey or lacrosse elbow pad 500 may also include other components, these have been omitted here for the sake of simplicity.

During a hockey game, the outer shell 510 portion of the hockey elbow pad 500 is typically involved in collisions of the player with extraneous objects, such as the surface of the ice or the sideboards of the hockey rink. In addition, the outer shell 510 may also be involved in contact with other players, such as when the hockey elbow pad 500 is raised to or around face level during close interactions between hockey players.

The outer shell 510 is produced using the same process that was described in FIG. 4. In this case, the only differences between the production of the shell 510 and the shell 200 would be the size and shape of the first, second and third sheets, as well as the mold or form used during the thermoforming step 470 to shape the composite sheet to its final form.

FIG. 6 shows shoulder pads 600 that are used to cover and provide protection for certain areas of the upper torso of a hockey or lacrosse player. The hockey or lacrosse shoulder pads 600 have outer shells 610, which is produced using the same process described with respect to FIG. 4. As with the outer shell 510 described above, the only difference between the production of the outer shell 610 and the outer shell 200 would be the size and dimensions of the first, second and third sheets, as well as the mold or form used during the thermoforming step 470 to shape the composite sheet to its final form.

Although various embodiments have been illustrated, this was for the purpose of describing, but not limiting, the invention. Various modifications will become apparent to those skilled in the art and are within the scope of this invention, which is defined more particularly by the attached claims.

The invention claimed is:

1. A method of making an outer shell, the method comprising:
   (a) providing first and second sheets, each of the first and second sheets being made of a layer of high-density polyethylene, polypropylene, polyurethane or polycarbonate extruded with a layer of non-woven fabric;
   (b) providing a third sheet made of high-density polyethylene foam, polypropylene foam, polyurethane foam or polystyrene foam, the third sheet having top and bottom sides;
   (c) affixing a first layer of adhesive film on the top side of the third sheet;
   (d) affixing a second layer of adhesive film on the bottom side of the third sheet;
   (e) placing the third sheet between the first and second sheets such that the first layer of adhesive film of the third sheet contacts the layer of non-woven fabric of the first sheet and the second layer of adhesive film of the third sheet contacts the layer of non-woven fabric of the second sheet;
   (f) stitching together the first, second and third sheets in order to form a composite sheet; and
   (g) thermoforming the composite sheet for forming the outer shell wherein the outer shell has a shape suitable for a hockey or lacrosse leg pad, shoulder pads or elbow pad.

2. A method as defined in claim 1, wherein the step of affixing the first layer of adhesive film on the top side of the third sheet comprises maintaining together the first layer of adhesive film and the third sheet at a temperature between 75° C. and 100° C. during 1 to 5 seconds.

3. A method as defined in claim 1, wherein the step of affixing the second layer of adhesive film on the bottom side of the third sheet comprises maintaining together the second layer of adhesive film and the third sheet at a temperature between 75° C. and 100° C. during 1 to 5 seconds.

4. A method as defined in claim 1, wherein a further layer of adhesive film is applied on the first layer of adhesive film and wherein the first and further layers of adhesive film and the third sheet are maintained together at a temperature between 75° C. and 100° C. during 1 to 5 seconds.

5. A method as defined in claim 1, wherein a further layer of adhesive film is applied on the second layer of adhesive film and wherein the second and further layers of adhesive film and the third sheet are maintained together at a temperature between 75° C. and 100° C. during 1 to 5 seconds.

6. A method as defined in claim 1, wherein a further layer of adhesive film is applied on the first or second layer of adhesive film.

7. A method as defined in claim 1, wherein the first and second layers of adhesive film are made of ethylene vinyl acetate thermoplastic or polyurethane.

8. A method as defined in claim 1, wherein the density of the high-density polyethylene foam is between 0.09 to 0.15 gr/cm$^3$.

9. A method as defined in claim 1, wherein the density of the polystyrene foam is between 0.05 to 0.15 gr/cm$^3$.

10. A method as defined in claim 1, wherein the high-density polyethylene foam, polypropylene foam, polyurethane foam or polystyrene foam has a honeycomb structure.

11. A method as defined in claim 1, wherein the high-density polyethylene foam, polypropylene foam, polyurethane foam or polystyrene foam forms a structural foam.

12. A method as defined in claim 1, wherein the high-density polyethylene foam, polypropylene foam, polyurethane foam or polystyrene foam is made by structural foam molding.

13. A method as defined in claim 1, wherein the high-density polyethylene foam, polypropylene foam, polyurethane foam or polystyrene foam is made by gas assist foam molding.

14. A method as defined in claim 1, further comprising placing the composite sheet in an oven at a temperature between 125° C. and 175° C. during 10 to 20 minutes before step (g).

15. A method as defined in claim 14, further comprising removing the composite sheet from the oven before step (g).

16. A method as defined in claim 15, wherein thermoforming is made at a pressure between 25 PSI to 50 PSI during 60 to 80 seconds.

17. A method as defined in claim 1, wherein thermoforming is made at a pressure between 25 PSI to 50 PSI and a temperature between 125° C. to 175° C. during 60 to 80 seconds.

* * * * *